United States Patent [19]

Takizawa et al.

[11] 3,855,354
[45] Dec. 17, 1974

[54] PROCESS FOR THE PREPARATION OF THERMOPLASTIC POLYMERS

[75] Inventors: Hidehiko Takizawa; Mituto Hisashige, both of Chiba, Japan

[73] Assignee: Denki Kogaku Kogyo Kabushiki Kaishi, Tokyo, Japan

[22] Filed: Nov. 14, 1972

[21] Appl. No.: 306,486

[30] Foreign Application Priority Data
Nov. 16, 1971  Japan.............................. 46-91806

[52] U.S. Cl. .......................... 260/880 R, 260/879
[51] Int. Cl. ........ C08f 1/60, C08f 19/08, C08f 1/04
[58] Field of Search ................................ 260/880 R

[56] References Cited
UNITED STATES PATENTS

| | | | |
|---|---|---|---|
| 3,448,175 | 6/1969 | Doak et al. | 260/880 |
| 3,515,692 | 6/1970 | Carrock | 260/880 |
| 3,542,905 | 11/1970 | Nishioka et al. | 260/880 |
| 3,644,587 | 2/1972 | Finberg | 260/880 |

*Primary Examiner*—James A. Seidleck
*Attorney, Agent, or Firm*—Sughrue, Rothwell, Mion, Zinn & Macpeak

[57] ABSTRACT

In the preparation of styrene type thermoplastic polymers by polymerizing an aromatic vinyl compound and acrylonitrile with an elastomer, the first step of polymerization is carried out by adding to the polymerization system a definite amount of an organic peroxide catalyst at the any time when the polymerization rate is within a range of 0 to 15 percent and subsequently the second step is carried out by adding to the polymerization system a definite amount of an azo-compound catalyst at the any time when the polymerization rate is within a range more than 15 percent and not exceeding 40 percent.

7 Claims, No Drawings

PROCESS FOR THE PREPARATION OF THERMOPLASTIC POLYMERS

BACKGROUND OF THE INVENTION

The present invention relates to a process for the preparation of styrene type thermoplastic copolymers which are provided with an excellent appearance and mechanical properties when formed to a sheet.

The styrene type thermoplastic polymers, hitherto, have been prepared by either bulk-polymerizing or solution-polymerizing monomers dissolved such an elastomer as polybutadiene therein, or carring out first a bulk-polymerization and subsequently a suspension polymerization.

Although polymers obtained by such conventional methods would be fully satisfactory as a resin for injecting molding, a sheet formed from the polymers bears fish eyes. In the case of a polymer obtained by the polymerization method with use of well known organic peroxides or by the thermal polymerization method, the fish eyes take place on the polymer sheet. On the other hand, in the case of a polymer obtained by the polymerization method with use of azo-compounds well known like the organic peroxides, the polymer sheet bears no fish eye but is remarkably reduced in a impact strength and elongation. This is conceivable on the ground that only polymers with low graft rate would be produced because of the retardation of graft reaction by the cyanoradical.

An object of the present invention is to provide styrene type thermoplastic polymers not bearing fish eyes free from an offensive odor and further not lowering mechanical properties such as impact strength, elongation and flexural strength when formed to a sheet.

SUMMARY OF THE INVENTION

In a process for the preparation of styrene type thermoplastic polymers by carring out the first step of polymerization under a bulk-or solution polymerization condition until a polymerization rate becomes any value within a range of 10 to 40 percent and subsequently carring out the second step of polymerization under a bulk-or suspension-polymerization condition in the case of said first step being under the bulk polymerization condition or under a solution polymerization condition in the case of said first step being under the solution polymerization condition, a polymerization of acrylonitrile and an aromatic vinyl compound or one containing a compound copolymerizable therewith with an elastomer is carried out by adding to the polymerization system 0.01 to 0.15 percent by weight of an organic peroxide catalyst based on the feed at any time when the polymerization rate is within a range of 0 to 15 percent and then adding to the polymerization system 0.01 percent by weight or more of an azo-compound catalyst based on the feed at any time when the polymerization rate is within a range more than 15 percent and not exceeding 40 percent.

DETAILED DESCRIPTION OF THE INVENTION

It is known that styrene type thermoplastic polymers are prepared by carring out the first polymerization until the polymerization rate becomes 10 to 40 percent and subsequently the second polymerization.

As a result of studies on the fish eye it has been conceived that a graft reaction at the time when the polymerization was proceeding to a certain extent would bring about a cause of formation of fish eyes. On the basis of this conception the above mentioned two-step polymerization method has been developed to the present invention.

It has not been found tht the first step of polymerization is carried out by adding to the polymerization system a definite amount of an organic peroxide catalyst during the initial stage of polymerization, and subsequently the second step of polymerization is carried out by adding to the system an azo-compound at the time when the polymerization was proceeding to a certain extent in order to retard a graft reaction. In this way, styrene type thermoplastic polymers having excellent characteristics can be produced by adding to the polymerization system a definite amount of the pertinent catalysts in accordance with the polymerization rate.

According to the present invention, the first step of polymerization is carried out by adding 0.01 to 0.15 percent by weight of an organic peroxide catalyst based on the feed at any time when the polymerization rate is within a range of 0 to 15 percent and the second step is carried out by adding 0.01 percent by weight or more of an azo-compound catalyst based on the feed at any time when the polymerization rate is within a range more than 15 percent and not exceeding 40 percent. If the organic peroxide is added when the polymerization rate is above 15 percent, there is disadvantage of increasing fish eyes of a polymer sheet. On the other hand, if the azo-compound catalyst is added when the polymerization rate 15 percent or less, the graft polymerization is retarded so that a polymer sheet obtained is reduced in a mechanical strength. Further, even if the azo-compound is added when the polymerization rate is exceeding 40 percent, the effect of lowering fish eyes can not be expected because of the adding time too late.

In the same way as the conventional processes for the preparation of styrene type resins, both the first and second steps are carried out by either the bulk polymerization method or the solution polymerization method, or the first step is carried out by the bulk polymerization method and the second step by the suspension polymerization method. In this connection it is undesirable to carry out both the first and second steps by the suspension polymerization method, because ununiform gels yield unless the bulk-or solution-polymerization are carried out under agitation until completion of phase transition.

Further, the first step of polymerization may be carried out without catalysts at the beginning and then with use of the organic peroxide catalyst so long as the polymerization rate is not more than 15 percent.

If an amount of the organic peroxide used as a catalyst is less than 0.01 percent by weight, little catalytic effect is exhibited with catalysts having low decomposition temperature because of lack of amount of an active oxygen. On the other hand, when the amount of the organic peroxide is more than 0.15 percent by weight the catalytic effect is improved but there is a disadvantage that fish eyes of a polymer sheet obtained is not decreased. Examples of the organic peroxide catalyst to be used include benzoylperoxide, lauroylperoxide, dicumylperoxide, 2,5-dimethylhexane 2,5-dihydroperoxide, dibutylperoxide, t-butylperoxybenzoate, t-butylperacetate and t-butylhydroperoxide.

An amount of the azo-compound catalyst is 0.01 percent by weight or more based on the feed, and little effect on the lowering of fish eye is exhibited with less than 0.01 percent by weight. Further, even if the amount of the azo-compound exceeds about 1.0 percent by weight, remarkable effects are not practically recognized so that it is preferred to use it in an amount of about 1.0 percent by weight or less. Examples of the azo-compound catalyst to be used include azobisisobutyronitrile, azobisvaleronitrile, azobiscyclohexanecarbonitrile, 2-diazo-2-propyl azoformamide, azobiscyanovaleric acid, and azobis-2-methyl butyronitrile.

A preferred feed for the preparation of styrene type thermoplastic polymers according to the present invention is composed of 2 to 15 percent by weight of an elastomer, 50 to 93 percent by weight of an aromatic vinyl compound and 5 to 35 percent by weight of acrylonitrile.

In this connection, with the presence of 5~35 percent by weight of acrylonitrile the styrene type polymer can be improved in its chemical resistance such as oil resistance and Freon gas resistance, and increased in a rigidity of resin, surface hardness and tensile strength as well. Further, little reinforcing effect on the resin is exerted with less than 2 percent by weight of the elastomer, while in case of exceeding 15 percent by weight the reinforcing effect is not so improved. The preferred amount of the aromatic vinyl compound depends on the amounts of the elastomer and acrylonitrile mentioned above.

Examples of the elastomer to be used include polybutadienes, nitrile rubbers, styrene-butadiene rubbers, polyisoprenes, ethylene-propylene rubbers and natural rubbers. Preferably, a particle size of the elastomer is within a range of 0.2 to 1.5$\mu$.

As examples of the styrene type compound, there are indicated aromatic vinyl compounds, such as styrene, $\alpha$-methylstyrene, $\beta$-bromostyrene, $p$-methylstyrene and $p$-methylisopropenylbenzene. Further, monomers copolymerizable with the aromatic vinyl compound may be used in admixture with it. Such monomers are exemplified by methacrylate esters, acrylic esters, acrylic acid, vinyl ketones and vinylesters.

A sheet formed from the polymer obtained by the present invention is extremely reduced in the fish eye as compared with polymer sheets obtained by the conventional processes and also possesses mechanical characteristics such as impact strength, elongation and flexural strength equal to those of the conventional polymer sheets, and thus applicable as excellent industrial materials.

The preferable polymer composition for an almost odorless sheet or molding is composed of about 4~8 percent by weight of an elastomer, about 10~35 by weight of acrylonitrile, 0~15 percent by weight of methylmethacrylate and the balance of an aromatic vinyl compound.

Furthermore, the polymer of the present invention has very little odor. It is generally said that the odor of a polymer resin would be caused by burning and evapolation of the resin components, particularly elastomers, the remaining monomers, dispersants and chain transfer agents owing to the thermal hysteresis during molding. In case of the polymer of the present invention an amount of the elastomer necessary relative to the same value of mechanical characteristics is about half as much as that in the emulsion polymerization so that the odor can be remarkable reduced. Also, in case of the suspension polymerization the dispersants are not almost involved in the polymer as compared with the case of the emulsion polymerization, and further the suspension polymerization near the end is carried out at high temperatures (for example, 130°C or more) so that the remaining monomers can be extremely decreased. Therefore, the polymer hardly having the odor can be produced according to the present invention.

The present invention is illustrated by the following examples wherein specimens, testing methods and rating methods used are indicated as under Examples 2 to 6, 8 and 18 are included only for comparative purposes.

SHEET FOR MEASUREMENT OF FISH EYE

A sheet extruded in a dimension of 0.1mm (thickness) × 40mm (width) by an extruder with screw of 40mm in diameter (US-40-25 type, TANABE PLASTIC Co., JAPAN) is cut to 1m in length.

| Grade | Rating of fish eye number of fish eyes |
|---|---|
| A | 1 to 4 |
| B | 5 to 8 |
| C | 9 to 12 |
| D | 13 to 20 |
| E | 21 and over |

INJECTION MOLDINGS FOR MEASUREMENT OF MECHANICAL STRENGTH

Molded by an injection molding machine - In line screw type 202 (MEIKI Co. JAPAN)
1. Izod impact strength
   Measured by ASTM D-256
2. Elongation
   Measured by ASTM D-638
3. Gloss
   Measured by JIS Z-8741

SHEET FOR MEASUREMENT OF MECHANICAL STRENGTH (EXTRUSION MOLDINGS)

A sheet extruded in a dimension of 0.5mm (thickness) × 500mm (width) by an extruder with screw of 40mm in diameter (US-40-25 type, TANABE PLASTIC Co., JAPAN) is cut to pieces suitable for measurement of mechanical strength.

1. FILM IMPACT STRENGTH (IZOD IMPACT STRENGTH)

As to the sheet for measurement of mechanical strength cut to a square of 150mm in an side, its strength is measured by Izod impact testing machine provided with a hemisphere of 5mm in radius (TESTER SANGYO Co. JAPAN) according to ASTM D-256. 256.

2. ELONGATION AND TENSILE STRENGTH

As to the sheet for measurement of mechanical strength cut to a rectangle of 10mm × 100mm, the elongation and tensile strength in respect of the longitudinal and transverse directions each are measured by a testing machine (TESTER SANGYO Co. JAPAN) according to ASTM D-638.

3. FLEXURAL STRENGTH

The frequency of vibrations is measured by fixing the sheet for measurement of mechanical strength at both ends and vibrating both ends alternately by a vibrator till the sheet is broken down, according to JIS P-8115.

Melt flow index
Measured by ASTM D-1238
Measurement of graft rate

A produced polymer is dissolved in methylethylketone, which is then separeted to a graft phase and homopolymer phase by a centrifugal separator, and the graft phase is fully washed with methylethylketone and deposited from methanol. A graft rate is defined as follows:

Graft rate (percent)=Weights of graft phase/Weights of elastomer × 100

EXAMPLE 1

A feed solution dissolved 2.5Kg of polybutadiene rubber (Diene 35 NF, ASAHI KASEI Co. JAPAN) in a mixture of 31.25Kg of styrene monomer with 11.25Kg of acrylonitrile was charged into an autoclave of a 50 l capacity, and agitated by a rotating impeller with 100 rpm while passing nitrogen gas through the autoclave for 10 minutes. Then, to the feed solution were added 45g (0.1 percent based on the feeds) of benzoylperoxide catalyst (BPO) and 45g of n-dodecylmercaptan (n-DDM) as a molecular weight modifier, and the first polymerization was carried out at a temperature of 80°C for 3 hours till the polymerizaton rate 30 percent.

A product obtained thus was cooled once to a temperature of 50°C, and added with 45g (0.1 percent based on the feed) of the azobiscyclohexanecarbonitrile catalyst (ACHN) and 100g of β-bromostyrene, and then kneaded together for 15 minutes while stirring. Thus obtained mixture was charged into another autoclave of a 200 l capacity contained 70Kg of aqua pura and 100g of polyvinylalcohol therein and the contents were agitated so as to become suspension.

Further, 200g of β-bromostyrene were added thereto and the autoclave, after substitution of air with nitrogen gas, was closed. The suspension polymerization as the second step was carried out at a temperature of 100°C for five hours and subsequently at a temperature of 130°C for 3 hours to complete substantially the reaction, and a polymer obtained thus was dehydrated and dried.

Specimens prepared from the above polymer according to the preparation methods of specimens mentioned hereinbefore were measured in respect of characteristics of the polymer by the afore-mentioned measurements. The results are given in Table 1.

EXAMPLE 2

Example 1 was repeated except that cyclohexanonperoxide (Perhexa H, trade name by NIHON YUSHI Co. JAPAN) was used instead of ACHN as the suspension polymerization catalyst.

Similarly, characteristics of a polymer obtained were measured, the results being given in Table I.

EXAMPLE 3

Example 1 was repeated except that the first polymerizaton was carried out without catalysts at a temperature of 115°C for 3 hours till the polymerization rate of 28.8 percent and after a product obtained was cooled once to a temperature of 80°C, the suspension polymerization as the second step was carried out without catalysts at a temperature of 130°C for 5 hours and further at a temperature of 140°C for 4 hours.

Similarly, characteristics of a polymer obtained were measured, the results being given in Table 1.

EXAMPLE 4

The first polymerization was carried out at a temperature of 70°C with use of 90g (0.2 percent based on the feed) of azobisisobutyronitrile catalyst (AIBN) instead of 45g of BPO in Example 1, and the suspension polymerization as the second step was carried out using 180g (0.4 percent based on the feed) of AIBN catalyst and 45g (0.1 percent based on the feed) of ACHN catalyst at a temperature of 60°C for 10 hours, further at a temperature of 80°C for 2 hours and finally at a temperature of 130°C for 3 hours. Other procedures and conditions are the same as those of Example 1.

Similarly, characteristics of a polymer obtained were measured, the results being given in Table 1.

Table 1

| Specimens | Measurement item | Example 1 | Example 2 | Example 3 | Example 4 |
|---|---|---|---|---|---|
| Sheet for measurement of fish eye | Fish eye | A | E | E | A |
| Injection molding for measurement of mechanical strength | Izod impact strength (kg·cm/cm) | 6.0 | 5.8 | 4.9 | 3.0 |
| | Elongation (%) | 35 | 38 | 23 | 5 |
| | Gloss (%) | 92 | 91 | 95 | 90 |
| | Melt flow index (g/ten minutes) | 3.0 | 3.1 | 2.9 | 3.2 |
| Sheet for measurement of mechanical strength (Extrusion molding) | Izod impact strength (kg·cm/cm) | 8.0 | 7.2 | 5.5 | 4.1 |
| | Elongation (%) longitudinal | 35 | 38 | 9 | 5 |
| | transverse | 40 | 37 | 8 | 0 |
| | Tensile strength (kg/mm²) longitudinal | 3.5 | 3.4 | 3.7 | 4.0 |
| | transverse | 3.0 | 3.2 | 3.6 | 3.7 |
| | Flexural strength (frequency) longitudinal | 950 | 890 | 510 | 73 |
| | transverse | 340 | 370 | 145 | 21 |
| | Polymerization rate (%) * | 61.5  99.8 | 59.6  99.6 | 60.3  99.7 | 61.1  99.8 |
| | Graft rate (%) * | 240  245 | 248  270 | 235  260 | 158  170 |

* In the polymerization rate and graft rate columns the first figure each indicates a polymerization rate and graft rate of samples taken during polymerization rate of about 60%, and the second figure each indicates a polymerization rate and graft rate of samples taken at the time of completion of the second polymerization.

Table 1 shown that the specimens of Example 1 according to the present invention are well balanced in all the characteristics, while the specimens of Examples 2 to 4 are lowering in the fish eye or other characteristics. Further, the graft rate in Example 1 is not increasing wghen the polymerization rate exceeds about 60 percent so that the graft reaction has been retarded, while in Examples 2 to 3 the graft reaction is still proceeding even when the polymerization rate exceeds 60 percent. Also, Example 4 shows that little progress is being made with the graft reaction and accordingly the graft rate is low.

EXAMPLE 5

The first polymerization was carried out at a temperature of 80°C for 4 hours with use of 22.5g (0.05 percent based on the feed) of BPO catalyst and 22.5g (0.05 percent based on the feed) of ACHN catalyst till the polymerization rate of 30 percent, and a product obtained thus was subjected to the suspension polymerization (the second step) using 22.5g (0.05 percent based on the feed) of BPO catalyst and 22.5g (0.05 percent based on the feed) of ACHN catalyst. The other procedures and conditions are the same as those of Example 1.

In the same way, characteristics of a polymer obtained were measured, the results being given under Table 2.

EXAMPLE 6

The first polymerization was carried out at a temperature of 80°C for 5 hours with use of 45g (0.1 percent based on the feed) of ACHN catalyst till the polymerization rate of 30 percent, and a product obtained thus was subjected to the second polymerization using 45g (0.1 percent based on the feed) of BPO catalyst. The other procedures and conditions are the same as those of Example 1.

In the same way, characteristics of a polymer obtained were measured, the results being given under Table 2.

shows that when reversing the use order of the catalysts the purpose of the present invention could not be attained.

EXAMPLE 7

This example together with Example 8 is intended to decide the upper limit of amount of the organic peroxide catalyst in the first polymerization.

To the same feed composition as that of Example 1 were added 67g (0.15 percent based on the feed) of 2,5-dimethylhexane 2,5-dihydroperoxide (2,5H) and the first polymerization was carried out at a temperature of 130°C for an hour and 30 minutes. At this time the polymerization rate was 28.8 percent. A product obtained thus was subjected to the suspension polymerization as the second step using 90g (0.2 percent based on the feed) of ACHN catalyst. The other procedures and conditions were the same as those of Example 1.

In the same way, characteristics of a polymer obtained were measured, the results being given under Table 3.

EXAMPLE 8

Example 7 was repeated except that the first polymerization was carried out at a temperature of 125°C for an hour and 30 minutes with use of 90g (0.2 percent based on the feed) of 2,5H catalyst till the polymerization rate of 29,7 percent.

Similarly, characteristics of a polymer obtained were measured, the results being given under Table 3.

EXAMPLE 9

This example is intended to decide the lower limit of amount of the organic peroxide catalyst.

Example 1 was repeated except that the first polymerization was carried out using 4.5g (0.01 percent based on the feed) of lauroylperoxide (L PO) at a temperature of 100°C for 4 hours till the polymerization rate of 21 percent.

Similarly, characteristics of a polymer obtained were measured, the results being given under Table 3.

Table 2

| Specimens | Measurement item | | Example 5 | Example 6 |
|---|---|---|---|---|
| Sheet for measurement of fish eye | Fish eye | | E | E |
| Injection molding for measurement of mechanical strength | Izod impact strength (kg·cm/cm) | | 5.8 | 5.5 |
| | Elongation (%) | | 31 | 27 |
| | Gloss (%) | | 90 | 94 |
| | Melt flow index (g/ten minutes) | | 3.0 | 3.1 |
| Sheet for mesurement of mechanical strength (Extrusion molding) | Izod impact strength (kg·cm/cm) | | 7.1 | 7.3 |
| | Elongation (%) | longitudinal | 30 | 27 |
| | | tranverse | 33 | 21 |
| | Tensile strength (kg/mm²) | longitudinal | 3.6 | 3.6 |
| | | tranverse | 3.2 | 3.3 |
| | Flexural strength (frequency) | longitudinal | 810 | 703 |
| | | transverse | 205 | 118 |

From Table 2 it is clear that both Examples 5 and 6 are unsatisfactory because of the formation of fish eye. Further, Example 5 shows that with use of the catalyst in the form of a mere mixture of the organic peroxide with the azo-compound the purpose of the present invention could not be attained. Moreover, Example 6

EXAMPLE 10

A polymerization was carried out in the same way as Example 1 except that the second suspension polymerization was carried out using 4.5g (0.01 percent based on the feed) of ACHN catalyst at a temperature of 120°C for 5 hours, then at a temperature of 130°C for 2 hours, and furthermore at a temperature of 140°C for 3 hours.

In the same way, characteristics of a polymer obtained were measured, the results being given under Table 3.

EXAMPLE 11

A polymerization was carried out in the same way as Example 10 except that the second suspension polymerization was carried out using 450g (1 percent of the feed) of ACHN catalyst at 90°C for 6 hours, subsequently at 115°C for 2 hours and furthermore at 130°C for 3 hours.

In the same way, characteristics of a polymer obtained were measured, the results being given under Table 3.

sequently, the second polymerization was carried out in the same manner as Example 1 except that the suspension polymerization was effected with the use of 45g (0.1 percent based on the feed) of ACHN and 225g (0.5 percent based on the feed) of AIBN at a temperature of 60°C for 10 hours, then at a temperature of 90°C for 2 hours and furthermore at a temperature of 130°C for 3 hours.

Similarly, characteristics of a polymer obtained were measured, the results being given under Table 4.

EXAMPLE 14

This example is directed to the case that the first and second steps were continuously effected under the bulk polymerization with the use of autoclaves connected in series. The first autoclave of a 5 l capacity, the second of a 10 l capacity and the third of a 5 l capacity are con- Table 3

| Specimens | Measurement item | Example 7 | Example 8 | Example 9 | Example 10 | Example 11 |
|---|---|---|---|---|---|---|
| Sheet for measurement of fish eye | Fish eye | A | B | A | A | A |
| Injection molding for measurement of mechanical strength | Izod impact strength (kg·cm/cm) | 6.1 | 6.0 | 5.8 | 6.4 | 5.7 |
| | Elongation (%) | 37 | 38 | 33 | 39 | 32 |
| | Gloss (%) | 92 | 90 | 93 | 91 | 97 |
| | Melt flow index (g/ten minutes) | 2.8 | 2.9 | 2.9 | 2.9 | 3.2 |
| Sheet for measurement of mechanical strength (Extrusion molding) | Izod impact strength (kg.cm/cm) | 8.1 | 8.0 | 7.9 | 8.1 | 7.7 |
| | Elongation (%) longitudinal | 41 | 40 | 42 | 41 | 36 |
| | tranverse | 37 | 39 | 31 | 38 | 29 |
| | Tensile strength (kg/mm$^2$) longitudinal | 3.4 | 3.5 | 3.6 | 3.5 | 3.6 |
| | transverse | 3.1 | 3.3 | 3.4 | 3.1 | 3.5 |
| | Flexural strength (frequency) longitudinal | 930 | 910 | 870 | 920 | 880 |
| | tranverse | 420 | 408 | 320 | 375 | 309 |

Table 3 shows that Example 7, 9, 10 and 11 according to the present invention were satisfactory in the fish eye and also the other characteristics while the specimen of Example 8 was not satisfactory in use for sheet because of the fish eye. The cause of the latter is conceivable on the ground that the organic peroxide (2,5H) was used in the amount of 0.2 percent too much for the first polymerization catalyst so that the effect of the 2,5H catalyst was still remaining during the second polymerization.

EXAMPLE 12

This example was carried out in the same procedure as Example 1 except that the feed composed of a mixture solution of 22,1kg of styrene monomer, 15kg of acrylonitrile and 4,5kg of methylmethacrylate, and 3,4kg of styrene-butadiene rubber (SBR) (Tufdene 2100, trade name by ASAHI KASEI Co. JAPAN) dissolved therein was used.

In the same way, characteristics of a polymer obtained were measured, the results being given under Table 4.

EXAMPLE 13

The first polymerization was carried out in the same manner as Example 1 except that the polymerization was carried out using 3,4kg of SBR (Tufdene 2100, trade name by ASAHI KASEI Co.) in stead of polybutadiene till the polymerization rate of 17 percent. Subnected in series, all being provided with a stirrer.

A feed composition consisting of 22kg of acrylonitrile, 66kg styrene monomer and 12kg of polybutadiene (Diene 35NF, ASAHI KASEI Co. JAPAN) was added with 100g (0.1 percent based on the feed) of dibutylperoxide catalyst (DBP) and 20g (0.02 percent based on the feed) of t-dodecylmercaptane (t-DDM) as a molecular weight modifier, and charged into a vessel to mix and dissolve. The solution obtained thus was continuously charged into first autoclave through its bottom at a feed speed of 2 l per an hour. Then, the feed was withdrawn from the top of the first autoclave and led into the bottom of second autoclave. To this point the feed stream was forced in by a pump, and then withdrawn from the top of the second autoclave by a small-sized high viscosity gear pump, further charged into third autoclave through the side near the top, and finally withdrawn from the bottom of the third by the high viscosity gear pump, and futhermore extruded in a strand form through nozzles. In this case the third autoclave in a flash tank which is reduced to an internal pressure of 50mmHg and its top is provided with a condenser so that an unreacted monomer can be recovered.

In this example, a solution consisting of a mixture liquid of 73g of styrene monomer and 24g of acrylonitrile and 3g (0.15 percent based on the feed) of ACHN catalyst dissolved therein was fed into the second autoclave through its bottom by high accuracy plunger pump at a feed speed of 100ml/hour. In the stationary state the first autoclave was under conditions of a temperature of 120°C and polymerization rate of 38 percent, and the second under conditions of a temperature of 135°C and polymerization rate of 90 percent.

Characteristics of a polymer obtained were measured, its results being given under Table 4.

EXAMPLE 15

Example 14 was repeated except that 9kg of toluene were added to 100kg of the feed composition as mentioned in Example 14 and the polymerization was carried out by a solution polymerization method.

Characteristics of a polymer obtained were measured, its results being given under Table 4.

EXAMPLE 16

3.4kg of SBR (Tufdene 2100, ASAHI KASEI Co.) were dissolved in a mixture liquid of 31.25kg of styrene monomer, 6,75kg of acrylonitrile and 4,5kg of butylacrylate and a solution obtained thus was charged into the 50 l capacity autoclave as mentioned in Example 1, and further added with 45g of α-methylstyrene dimer. The feed was polymerized at the beginning without catalysts at a temperature of 115°C for 2 hours and the product obtained was cooled to 100°C. At this time the polymerization rate was 14 percent. Further, the product was added with 22.5g (0.05 percent based on the feed) of t-butylperoxybenzoate catalyst and polymerized at a temperature of 100°C for an hour and 30 minutes, and cooled once to a temperature of 60°C. At this time the polymerization rate was 29.4 percent.

Next, the product obtained thus was incorporated with 45g of α-methylstyrene dimer 90g (0.2 percent based on the feed) of azobisvaleronitrile catalyst and 22,5g (0.05 percent based on the feed) of ACHN catalyst. This mixture was fed into another autoclave of a 200 l capacity charged a suspension consisting of 70kg of aqua pura and 700g of tricalcium phosphate therein while substituting the air within the autoclave with nitrogen gas. Thereafter the suspension polymerization was carried out at a temperature of 75°C for 8 hours and then at a temperature of 100°C for 2 hours, and furthermore at a temperature of 130°C for 3 hours.

Characteristics of a polymer obtained were measured, its results being given under Table 4.

EXAMPLE 17

A polymer obtained in the same way as Example 16 except that methylmethacrylate was used in stead of butylacrylate was formed to a blow bottle of a 330ml inner volume by a blow molding machine, TBMA-40 type (TAWARA TEKKOSHO Co., JAPAN). After 5 minutes the stopper of the bottle was cut to take a odor, its result being given under Table 4.

EXAMPLE 18

ABS resin (polybutadiene 13 percent; polyacrylonitrile 20 percent) produced by the conventional emulsion polymerization method was formed to a blow bottle and tested on a odor in the same way as Example 17.

The result of the test is given together with characteristics of the polymer under Table 4.

Table 4

| Specimens | Measurement item | | Example 12 | Example 13 | Example 14 | Example 15 | Example 16 | Example 17 | Example 18 |
|---|---|---|---|---|---|---|---|---|---|
| Sheet for measurement of fish eye | Fish eye | | A | A | A | A | A | A | B |
| Injection molding for measurement of mechanical strength | Izod impact strength (kg·cm/cm) | | 6.0 | 6.2 | 13.8 | 13.5 | 6.0 | 6.0 | 7.0 |
| | Elongation (%) | | 50 | 43 | 62 | 61 | 37 | 37 | 12 |
| | Gloss (%) | | 85 | 83 | 79 | 76 | 100 | 100 | 98 |
| | Melt flow index (g/ten minutes) | | 1.4 | 2.8 | 2.0 | 2.5 | 3.4 | 3.4 | 3.0 |
| Sheet for measurement of mechanical strength (Extrusion molding) | Izod impact strength (kg·cm/cm) | | 7.8 | 8.2 | 13.0 | 14.1 | 7.6 | 7.6 | 7.5 |
| | Elongation (%) | longitudinal | 43 | 43 | 60 | 65 | 40 | 40 | 15 |
| | | transverse | 37 | 38 | 50 | 53 | 33 | 33 | 10 |
| | Tensile strength (kg/mm$^2$) | longitudinal | 4.2 | 3.6 | 3.0 | 2.8 | 3.1 | 3.1 | 3.0 |
| | | transverse | 4.0 | 3.4 | 3.0 | 2.8 | 3.1 | 3.1 | 2.9 |
| | Flexural strength (frequency) | longitudinal | 870 | 865 | 1970 | 2008 | 904 | 904 | 130 |
| | | transverse | 380 | 395 | 1480 | 1601 | 402 | 402 | 200 |
| | Odor | | — | — | — | — | — | almost odorless | offensive odor |

It is obvious from Table 4 that all Examples 12 to 17 indicate the satisfactory characteristics. Example 12 shows that with the use of SBR as the elastomer the full satisfactory results are obtained. Also, Example 13 shows that the first step of polymerization may be ceased when the polymerization rate became 17 percent. As shown in Examples 14 and 15, both the first and second steps can be carried out also under the bulk polymerization or solution polymerization with the satisfactory results. Furthermore, it is obvious from Example 16 that the monomer copolymerizable with the aromatic vinyl compound can be used together, and that other conventional suspension stabilizers than polyvinyl alcohol can be used in the second suspension polymerization. In case of Example 17 an excellent resin hardly having odor is obtained, while in Example 18 according to the emulsion polymerization method a resin with offensive odor is obtained.

What is claimed is:

1. In a two step process for the preparation of styrene type thermoplastic polymers from a composition comprising 2 to 15 percent of an elastomer, 5 to 35 percent of acrylonitrile and 50 to 93 percent of an aromatic vinyl compound or a mixture of said aromatic vinyl compound with up to 15 percent of another compound other than acrylonitrile copolymerizable with said aromatic vinyl compound, said per cents being by weight, utilizing an organic peroxide catalyst in the first step and azo-compound catalyst in the second step, by carrying out the first step of polymerization until the polymerization rate becomes any value within a range of 10 to 40 percent and subsequently carrying out the second step of polymerization, the improvement comprising in carrying out the first step of polymerization by adding to the polymerization system 0.01 to 0.15 percent by weight of the organic peroxide catalyst, said amount of organic peroxide catalyst being all of the organic peroxide catalyst used during said polymerization, based on the feed at any time when the polymerization rate is within a range of 0 to 15 percent, and then continuing said polymerization by adding to the system in said second step 0.01 percent by weight or more of the azo-compound catalyst, said amount being all of the azo-compound catalyst used during said polymerization, based on the feed at any time when the polymerization rate is within a range of more than 15 percent and not more than 40 percent.

2. A process according to claim 1 wherein the first and second steps are carried out under a bulk polymerization condition.

3. A process according to claim 1 wherein the first and second steps are carried out under a solution polymerization condition.

4. A process according to claim 1 wherein the first step is carried out under a bulk polymerization condition and the second step under a suspension polymerization condition.

5. A process according to claim 1 wherein the first step of polymerization is carried out at the beginning without catalysts and then with use of the organic peroxide catalyst so long as the polymerization rate is not more than 15 percent.

6. A process according to claim 1 wherein a particle size of said elastomer is within a range of 0.2 to $1.5\mu$.

7. A process according to claim 1 wherein said fist step is carried out under a bulk polymerization condition using lauroylperoxide or benzoylperoxide or a mixture thereof as a catalyst and said second step is carried out under a suspension polymerization condition using azobiscyclohexanecarbonitrile alone or in mixture with azobisisobutyronitrile as a catalyst.

* * * * *